United States Patent [19]

Dischert et al.

[11] Patent Number: 4,470,125
[45] Date of Patent: Sep. 4, 1984

[54] MULTIPLIER FOR DIGITAL VIDEO SIGNALS USING A CASCADE OF SIGNAL-SELECTABLE MEMORIES

[75] Inventors: Robert A. Dischert, Burlington; James M. Walter, Columbus, both of N.J.

[73] Assignee: RCA Corporation, New York, N.Y.

[21] Appl. No.: 319,460

[22] Filed: Nov. 9, 1981

[51] Int. Cl.³ .............................................. G06F 7/52
[52] U.S. Cl. ................................................... 364/760
[58] Field of Search ... 364/200 MS File, 900 MS File, 364/754, 755, 757, 760

[56] References Cited

U.S. PATENT DOCUMENTS

| | | | |
|---|---|---|---|
| 3,443,079 | 5/1969 | Nathan | 364/757 |
| 3,919,535 | 11/1975 | Vattuone | 364/760 |
| 4,118,785 | 10/1978 | Izumi et al. | 364/757 |
| 4,168,530 | 9/1979 | Gajski et al. | 364/760 |
| 4,181,970 | 1/1980 | Izumi et al. | 364/760 |
| 4,240,106 | 12/1980 | Michael et al. | 358/36 |
| 4,240,113 | 12/1980 | Michael et al. | 358/180 |
| 4,242,704 | 12/1980 | Ito et al. | 358/167 |
| 4,293,922 | 10/1981 | David et al. | 364/757 |
| 4,344,151 | 8/1982 | White | 364/754 |
| 4,357,674 | 11/1982 | Ikeda et al. | 364/754 |

FOREIGN PATENT DOCUMENTS

| | | | |
|---|---|---|---|
| 54-67495 | 6/1979 | Japan | 364/757 |
| 55-52575 | 4/1980 | Japan | 364/757 |
| 839241 | 8/1955 | United Kingdom . | |
| 1291223 | 10/1968 | United Kingdom . | |
| 1543830 | 11/1976 | United Kingdom . | |

*Primary Examiner*—Gareth D. Shaw
*Assistant Examiner*—Daniel K. Dorsey
*Attorney, Agent, or Firm*—E. M. Whitacre; W. H. Meise; H. I. Steckler

[57] ABSTRACT

A high speed multiplier, such as for video signals features cascaded ROMs. Each ROM is divided into pages, and each page contains different multiplying coefficients. Different significant bits of a control signal are applied to each ROM to select a page for processing the video signal.

8 Claims, No Drawings

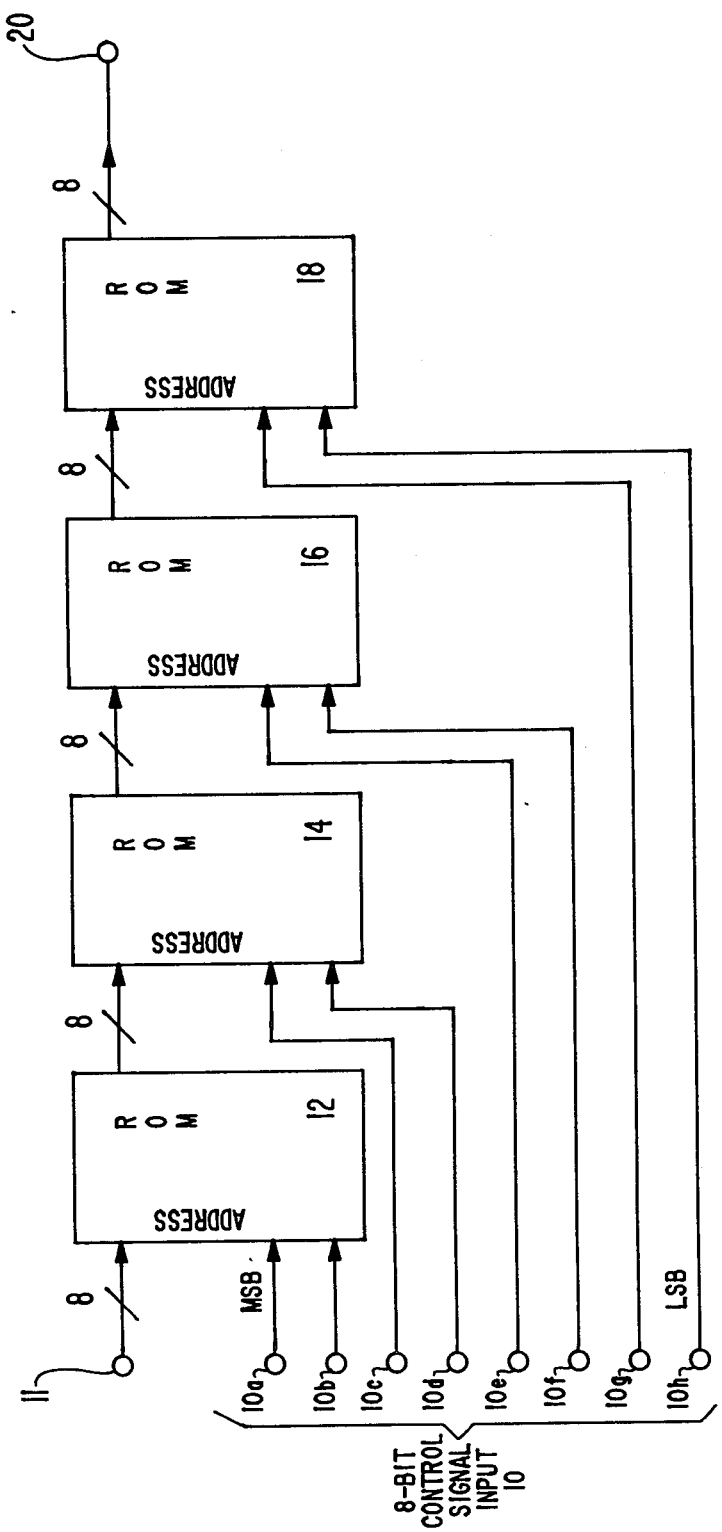

MULTIPLIER FOR DIGITAL VIDEO SIGNALS USING A CASCADE OF SIGNAL-SELECTABLE MEMORIES

BACKGROUND OF THE INVENTION

The present invention relates to digital signal processing, and more particularly, to multiplication of digital video signals.

Multiplication is a common signal processing function for video signals. Increasingly, video signals are in digital form, typically with 8-bit (256 grey scale levels) resolution. If it is desired to multiply an 8-bit digital signal by an 8-bit control signal (which can be another video signal, a shading signal, etc.), the resulting product signal has 16 bits (65,536 grey levels). Since a 16-bit signal cannot be transmitted through an 8-bit system, some of the output bits of the multiplier must be discarded. In particular, the 8 least significant bits would be discarded, leaving the 8 most significant bits to represent the product signal. Since the multiplier is capable of a 16-bit product signal, this discarding makes poor utilization of the relatively expensive multiplier.

One way of making a digital multiplier is to construct a look up table using a ROM (read only memory). The 8-bits each input and control signals can be considered as a single 16-bit address word, which word can "look up" 65,536 locations of data. But, again, if the product signal is restricted to an 8-bit word, then there are more locations of data than there are unique data words.

Another way of multiplying a signal is to use a microprocessor controlled RAM (random access memory) such as shown in U.S. patent application Ser. No. 286,264, filed July 23, 1981, in the name of R. A. Dischert and assigned to the assignee of the present application. In this system, the RAM is loaded with transfer coefficients (such as a multiplier) by the microprocessor (or, in an alternate embodiment, a hardwired circuit) during the vertical blanking interval or during several horizontal blanking intervals. Such a system may not be fast enough to do multiplication of a video signal where the multiplier signal is changing during a horizontal line, such as when the multiplier signal is a shading signal or another video signal.

It is therefore desirable to multiply large bandwidth signals in an inexpensive manner that makes full use of the circuits employed to do so.

SUMMARY OF THE INVENTION

Method and apparatus for processing a digital input signal in accordance with a digital control signal, comprising multiplying said input signal by a factor determined by at least one first bit of said control signal and having a given significance to form a first product signal, and thereafter multiplying said first product signal by a factor determined by at least one second bit of said digital control signal and having a significance other than said given significance to form a second product signal.

DESCRIPTION OF THE DRAWING

The sole FIGURE is a block diagram of the invention.

DETAILED DESCRIPTION

The FIGURE shows an 8-bit (8 input terminals, one for each bit of input signal) input terminal 11 that receives an 8-bit digital video signal. The input signal can be derived from a television camera, video tape recorder, etc., which signal has been digitized (sampled and then quantized) by an analog to digital converter (not shown) as is known in the art. The digital video signal is applied to 8-bits of a 10-bit address input of a 1K by 8 (1024 memory locations of 8 bits each) ROM 12. Such a ROM is type 93451 manufactured by Fairchild Co. and others. The circuit of the invention also has an 8-bit control signal input 10 comprising input terminals 10a, 10b, 10c, 10d, 10e, 10f, 10g, and 10h that respectively receive the MSB (most significant bit) to the LSB (least significant bit) of a multiplier control signal. This control signal can be derived from thumb wheel switches (not shown), a shaft encoder (not shown) that is coupled to knob, an analog to digital converter coupled to a potentiometer (not shown), or can comprise another digital video signal derived in manner stated with respect to the signal at input terminal 11. The two most significant bits are applied to the remaining two address inputs of ROM 12 for control of the attenuation of the signal derived from input terminal 11 in a manner described below.

The 8-bit output signal from ROM 12 is applied to 8-bits of the 10-bit address input of 1K by 8 ROM 14, the remaining two bits of the address inputs receiving the next two lower most significant bits of the control signal from input terminals 10c and 10d. In similar manner, the 8-bit output signal from ROM 14 is applied to the address inputs of 1K by 8 ROM 16, the remaining two address inputs receiving the control signal from input terminals 10e and 10f. Finally, the 8-bit output signal from ROM 16 is applied to the address inputs of 1K by 8 ROM 18, the remaining two address inputs receiving the next to least significant bit and LSB of the control signal from inputs 10g and 10h respectively. The digital video output signal from ROM 18 is available at 8-bit output terminal 20 for further processing or for conversion to an analog signal by a digital to analog converter (not shown).

Each of the ROMs 12, 14, 16 and 18 can be thought of as being made of 4 smaller ROMs, each of 256×8 size, each smaller ROM being called page 1, 2, 3, and 4 respectively. Page 1 of all ROMs is selected by having the binary signal 11 on the particular pair of control lines at terminal 10 for that particular ROM. It is desired to have no attenuation as a choice. Therefore, on page 1 of all ROMs a value is stored (in binary form) in its own address location. For example: page 1, address 1, value 1; page 1, address 2, value 2, etc.

For video signals, it is desired to adjust gain in increments that correspond to the smallest perceivable change in amplitude, which change is about 0.5 percent or 0.05 db. This change equals a multiplier of 0.995 and corresponds to a change that is 1 part in 200 or 46 db down from peak video amplitude. Consider now ROM 18, page 2, which is accessed by having binary 10 at inputs 10g and 10h respectively. The decimal numbers 0 through 255 multiplied by 0.995 are stored in binary from in the same relative locations as for page 1. In page 3 of ROM 18 (binary control signal 01) the decimal numbers 0 through 255 multiplied by $0.995^2$ are stored, again in the same relative locations. In page 4 of ROM 18 (control signal 00) the decimal numbers 0 through 255 multiplied by $0.995^3$ are stored, again in the same relative locations.

Now consider ROM 16. Pages 1, 2, 3 and 4 thereof have multiplying coefficients of $0.995^0$, $0.995^4$, $0.995^8$, and $0.995^{12}$ respectively. (The coefficient for page 1 of $0.995^{12}$ equals one, as discussed above). These coefficients are again multiplied by the decimal numbers 0 through 255, and also the pages are selected using the same binary control signals but now at inputs 10e and 10f. In a similar manner, the pages of ROM 14 have coefficients of $0.995^0$, $0.995^{16}$, $0.995^{32}$, and $0.995^{48}$ respectively, the pages being selected by signals at inputs 10c and 10d, while the pages of ROM 12 have respective coefficients of $0.995^0$, $0.995^{64}$, $0.995^{128}$, and $0.995^{192}$, the pages being selected by signals at inputs 10a and 10b.

It should be noted that a rounding rule is adopted in order to generate the values stored in the ROMs. This rounding will be applied to the video signal outputs of the ROMs. If the signal at output 20 is to be further processed, it is desirable to carry additional bits and 9-bit word length ROMs may be used.

The maximum attenuation for all four ROMs 12, 14, 16, and 18 is equal to 0.995 raised to the power $(3+12+48+192)=255$ or 0.28 which equals $-11$ db. Thus, with the above described embodiment, there is an attenuation range of 11 db in 0.05 db steps, which is adequate for the adjustment of transmission levels in a television studio. This is accomplished with a memory or storage of only 4K (1K in each ROM) by comparison with 64K memory which would be required for straight 8-bit by 8-bit multiplication. Of course, the scale factor could be any number that gives the desired level setting resolution e.g., a choice of 0.99 corresponds to approximately 0.1 db steps and gives a control range of about 22 db. Another modification is to add a fifth ROM that precedes ROM 12 and requires two more bits of control (the control word is now 10 bits wide). Using a 0.995 scale factor, a gain control with a 44 db dynamic range and 0.05 db resolution is achieved. If instead of linear gain control (constant db steps) linear amplitude control is desired, a ROM having an exponential transfer function can be placed in the control lines 10.

The look-up table multiplier of the present invention can literally multiply one video-bandwidth signal by another video-bandwidth signal, making it possible to control gain pixel-by-pixel, should that be a requirement, such as for shading. Since shading requires only a limited dynamic range (6 to 10 db is adequate), the number of stages can be reduced from the form shown in the drawing.

The drawing illustrates a hardware system based on a 1K×8 ROM. Further hardware reduction is certainly possible as higher-density fast-access ROMs become available. Consider a 4K×8 ROM. There are 16 pages of 256×8 in this device and only two such devices would be required to implement this system with the same amount of total attenuation and resolution.

In an actual embodiment, latches are provided between the ROMs.

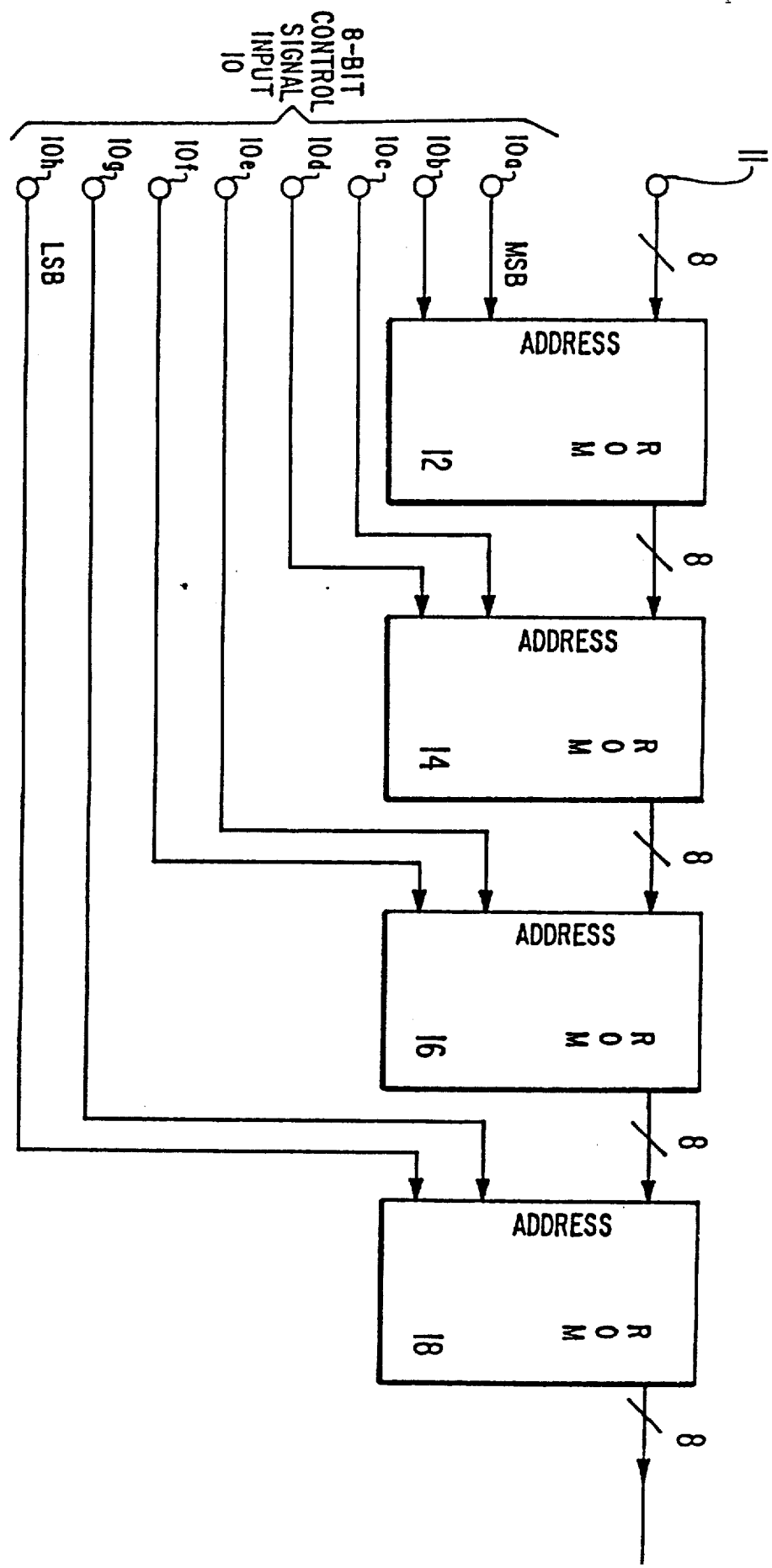

What is claimed is:

1. A method for multiplying first and second digital signals together, comprising the steps of:
    dividing the bits of said first digital signal into a subset and a remainder of the set of bits of said first digital signal;
    applying the entirety of said second digital signal to a subset of the address input terminals of a first addressable memory means thereby leaving a remainder of address input terminal;
    applying said subset of the bits of said first digital signal to said remainder of address input terminals so as to generate a first product signal at the output of said first addressable memory means which first product signal is a function of the values of said entirety of said second input signal and said subset of said first input signal; and
    applying the entirety of said first product signal to a subset of the input terminals of a second addressable memory means together with at least a portion of said remainder of the set of bits of said first digital signal to produce at the output of said second addressable memory means a second digital product signal which represents a product of said first and second digital signals.

2. A multiplying apparatus, comprising:
    first addressable memory means having first address terminals adapted for receiving the entirety of a first digital input signal at a first subset of said first address terminals and at least a first subset of the set of all bits of a second digital signal at a second subset of said first address terminals for producing an output signal representing the contents of said first memory means at the location accessed by the signals applied to said first address terminals; and
    second addressable memory means including second address terminals, a subset of said second address terminals being coupled to said first addressable memory means for receiving the entirety of said output signal therefrom, and a further subset of said second address terminals being coupled to receive a further portion of said set of all bits of said second digital signal, for producing at output terminals of said second addressable memory means a second output signal representing the contents of said second addressable memory means at the locations accessed by said first output signal and by said further portion of said second digital signal.

3. A multiplying apparatus according to claim 2 wherein said further portion of said set of all bits of said second digital signal is of less significance than said first portion of said second digital signal.

4. An apparatus according to claim 2 wherein said first digital signal and said first-mentioned output signal have the same number of bits.

5. An apparatus according to claim 4 wherein said second output signal has the same number of bits as said first input signal.

6. An apparatus according to claim 2 wherein:
    said first input signal is an 8-bit video signal; and
    said first subset of the set of all bits of said second digital signal has two bits.

7. An apparatus according to claim 6 wherein said two-bit subset of said second digital signal represents the most significant portion of said second digital signal.

8. An attenuator for attenuating first 8-bit digital signals under a control of a second digital signal, comprising:
    first addressable memory means including an approximately 10-bit address input terminal set, a first subset of 8 bits of said input terminal set being coupled to receive the entirety of said first digital signal and a second subset of said input terminal set being coupled to receive a first subset of the bits of said second digital signal, each location of said first memory means being loaded with an approximately 8-bit digital value, which digital value represents said first subset portion of the address of said location multiplied by an attenuating factor near $0.995^N$ where N is one of a limited number of integers, whereby said first addressable memory means produces a first 8-bit output signal representing said first digital signal multiplied by about $0.995^N$, where said limited number is established by the number of bits in said second subset of the bits of said second digital signal; and second addressable memory means including an approximately 10-bit second address input terminal set, to which the entirety of said first output signal from said first memory means and a second subset of the bits of said second digital signal, which second subset of the bits of second digital signal includes none of the bits of said first subset of the bits of said second digital signal, each memory location of said second memory means being loaded with an 8-bit digital number, which 8-bit digital number represents a product of an attenuation factor near $0.995^M$ and the address of the particular memory location in said addressable second memory means in which each said digital number is located, where M is one of a limited number of integers, and said limited number is established by the number of bits in said second subset of the bits of said second digital signal, to produce a second output signal which represents said first digital input signal multiplied by approximately $0.995^{M+N}$.

* * * * *

UNITED STATES PATENT AND TRADEMARK OFFICE
CERTIFICATE OF CORRECTION

PATENT NO. : 4,470,125

DATED : September 4, 1984

INVENTOR(S) : Robert A. Dischert et al.

It is certified that error appears in the above-identified patent and that said Letters Patent is hereby corrected as shown below:

Col. 3, line 2, $0.995^{12}$ should be -- $0.995°$ --

Insert FIG. 1 as part of Letters Patent as shown on the attached sheet.

On the title page "No Drawings" should read -- 1 Drawing Figure --

Signed and Sealed this

Tenth Day of December 1985

[SEAL]

Attest:

DONALD J. QUIGG

Attesting Officer

Commissioner of Patents and Trademarks